United States Patent [19]

Asakura et al.

[11] Patent Number: 5,019,845
[45] Date of Patent: May 28, 1991

[54] FLASH DEVICE FOR CAMERA

[75] Inventors: Yasuo Asakura, Hachioji; Yuji Imai, Higashiyamato; Yuji Kobayashi, Hachioji, all of Japan

[73] Assignee: Olympus Optical Co., Ltd., Japan

[21] Appl. No.: 537,040

[22] Filed: Jun. 12, 1990

[30] Foreign Application Priority Data

Jun. 23, 1989 [JP] Japan ................................ 1-73989[U]
Jun. 23, 1989 [JP] Japan ................................ 1-73990[U]
Jun. 23, 1989 [JP] Japan ................................ 1-161895
Jun. 23, 1989 [JP] Japan ................................ 1-161896

[51] Int. Cl.$^5$ .......................................... G03B 15/05
[52] U.S. Cl. .............................. 354/149.1; 354/145.1; 354/149.11
[58] Field of Search ................. 354/132, 145.1, 148, 354/149.1, 149.4

[56] References Cited

FOREIGN PATENT DOCUMENTS 53-62330 5/1978 Japan .
63-2030 1/1988 Japan .

Primary Examiner—Michael L. Gellner
Attorney, Agent, or Firm—Louis Weinstein

[57] ABSTRACT

A flash device for a camera comprises a plurality of flash light emitting portions having different flash illumination angles. A single common electric charge storage supplies energy to each of the flash light emitting portions. Each of a plurality of triggers corresponds to one of flash light emitting portions. In response to the focal length of a taking lens disposed in the camera, a controller determines which of a plurality of the flash light emitting portions to be fired and trigger the appropriate trigger corresponding to the flash light emitting portion to be fired.

14 Claims, 12 Drawing Sheets

FIG. I

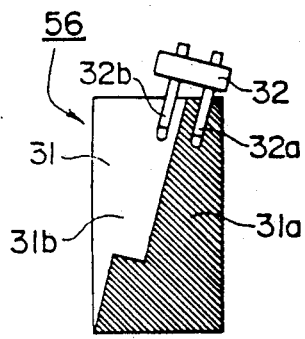
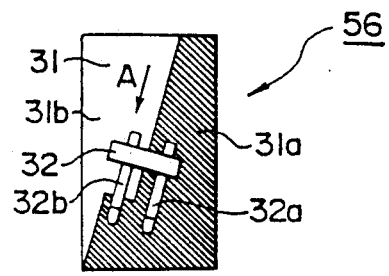
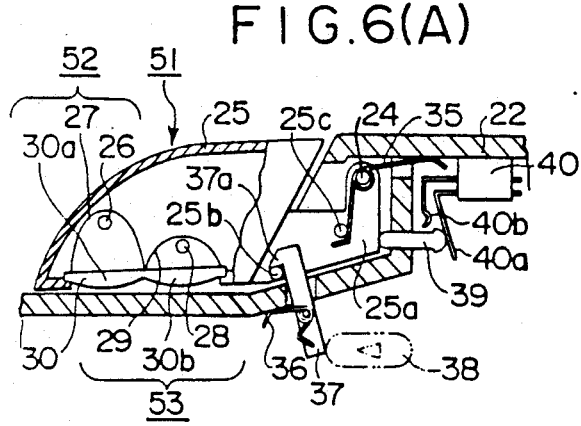
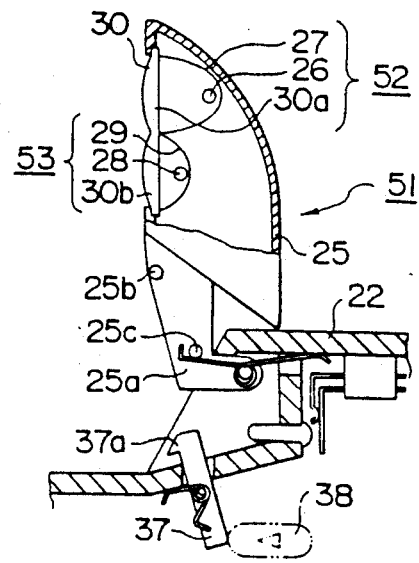
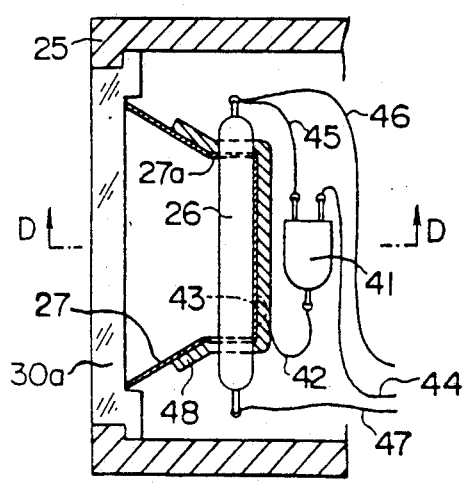
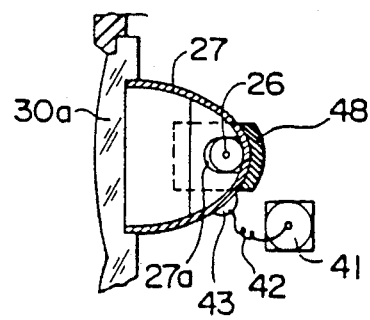

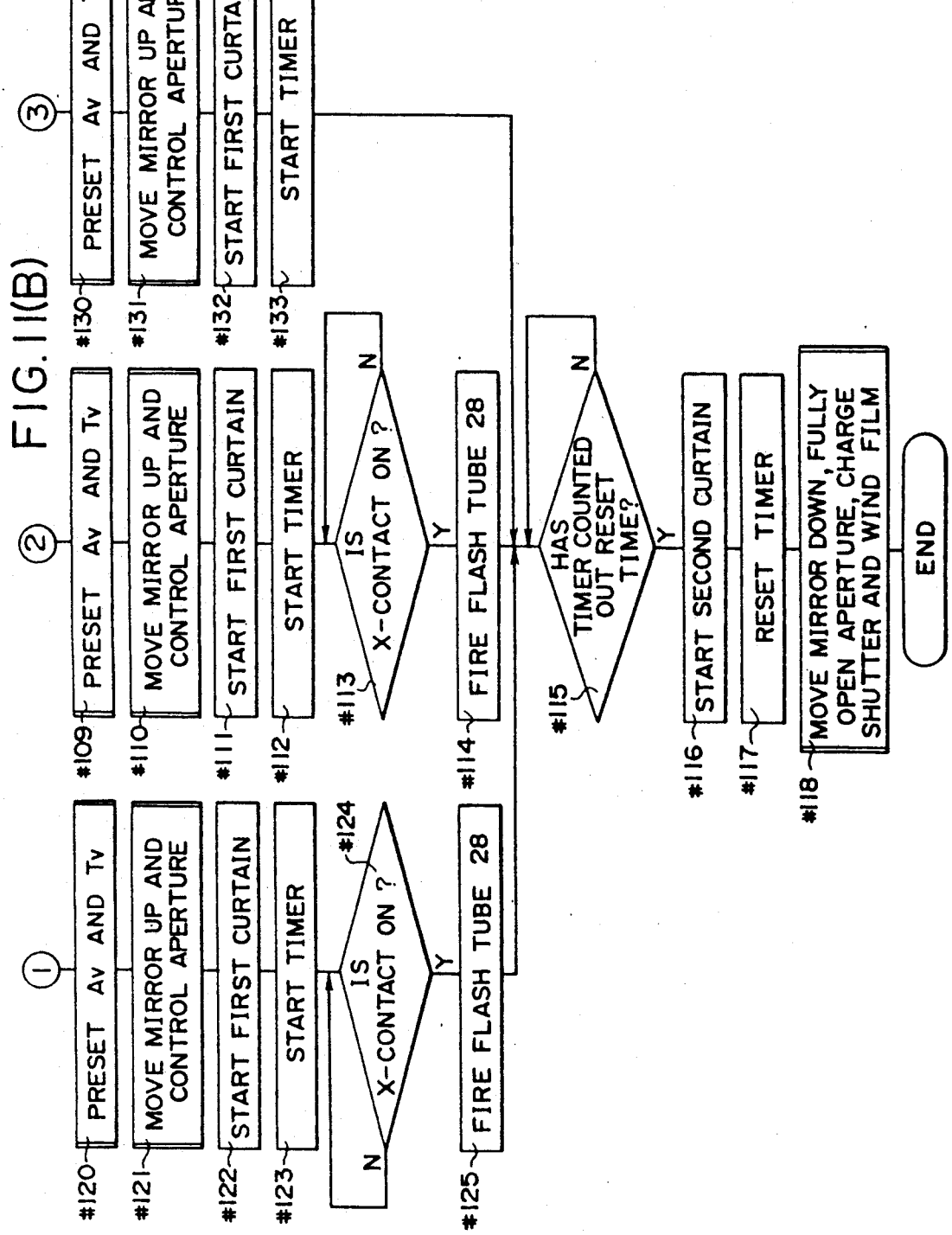

F I G. 16(A)
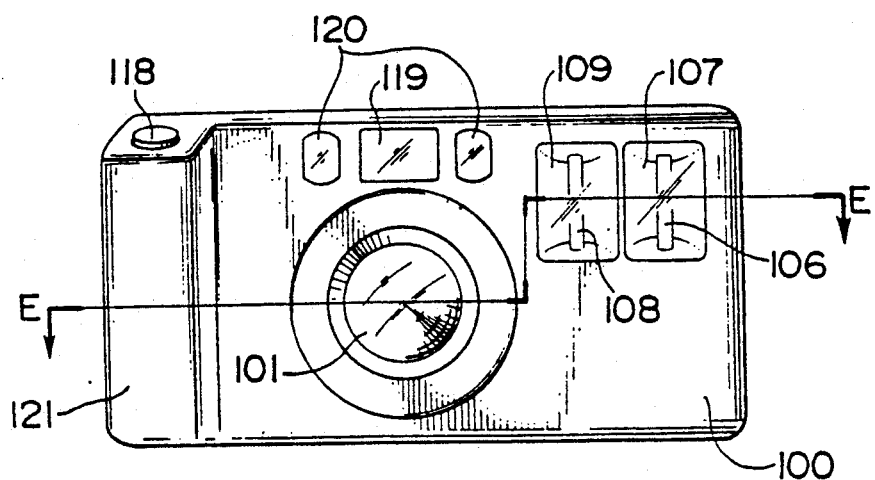
F I G. 16(B)
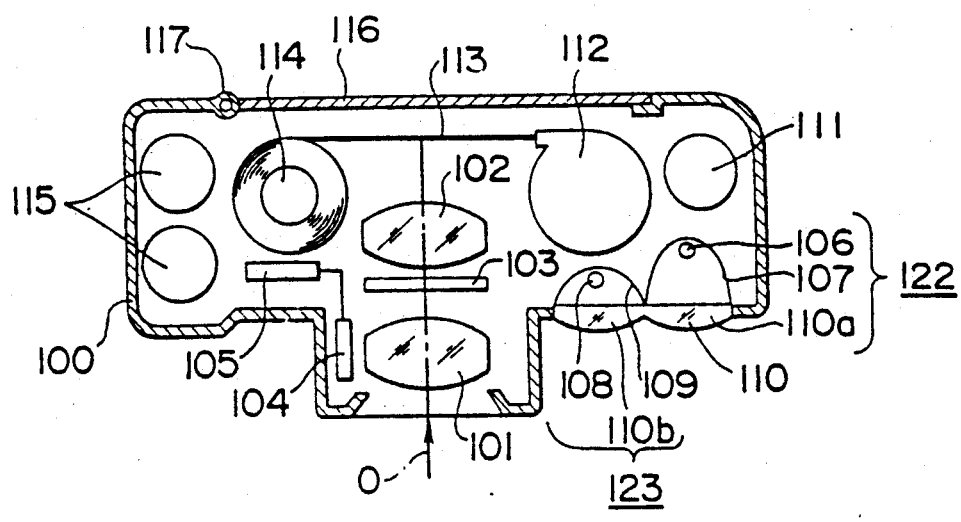

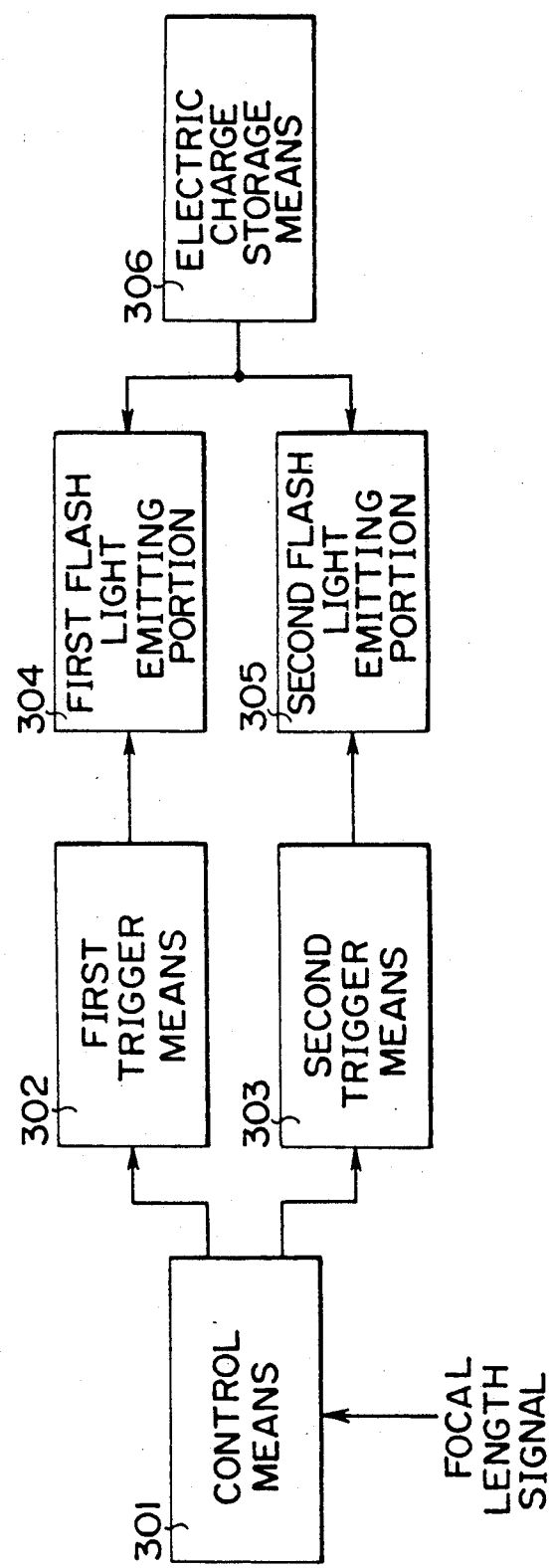

FLASH DEVICE FOR CAMERA

FIELD OF THE INVENTION

The present invention relates to a flash device for a camera, and in particular to a flash device for a camera having as a taking optical system a zoom lens system which is driven by a motor and a flash device including a plurality of flash light emitting tubes.

BACKGROUND OF THE INVENTION

Recently, various types of cameras such as a zoom lens equipped camera, a multi-focus camera in which a plurality of focal lengths may be preset and a system camera in which various zoom lenses are exchangeable have been put on the market. Together with this, a camera having a zoom flash mounted thereon in which the flash illumination angle may be continuously changed has also been put on the market. Such means for changing the flash illumination angle of a zoom flash unit is disclosed in, for example, Japanese Unexamined Utility Model Publication Sho/No. 53-62330 and Japanese Unexamined Patent Publication Sho/No. 63-2030.

A photographic flash device disclosed in the Japanese Unexamined Utility Model Publication Sho/53-62330 comprises a main body, illumination angle changing means which is slidably disposed on the main body to cover the front part of a light emitting portion of the main body and having an optical lens secured to the front part thereof, and a sliding member which is actuated from outside of the main body for causing the illumination angle changing means to slide forwardly or rearwardly to a desired position and to hold the same there. The flash illumination angle may be changed by moving a condenser lens of a flash along an optical axis.

A lens shutter type zoom lens camera disclosed in the Japanese Unexamined Patent Publication No. 63-2030 comprises a powered zoom lens system which is a taking lens system, a magnification variable view finder optical system and an illumination angle variable flash unit which are interlocked with the zooming operation. A single cam plate is disposed above the view finder optical system and the flash unit. The cam plate is movable in a direction normal to the optical axis of the taking lens. The cam plate is formed with cam grooves for moving the magnification variable lens group of the magnification variable view finder optical system and a light-emitting tube of the variable illumination angle flash unit. The cam plate is interlocked with the zooming operation to be moved in a direction normal to the optical axis. Accordingly a simple structure using a single cam plate makes it possible to interlock the cam plate with the zooming operation for changing the field of view of the view finder and for moving the light emitting portion including a light emitting tube and a reflector of the flash unit to change the flash illumination angle.

As mentioned above, in the Japanese unexamined Utility Model Publication Sho/No. 53-62330 and the Japanese Unexamined Patent Application Sho/No. 63-20,30 the condenser lens of the flash is moved along the optical axis and the light-emitting portion is moved along the optical axis, respectively on changing the illumination angle of the flash in response to the focal length of the taking lens. The flash device disclosed in these publications inevitably invites complication and large size of an illumination angle changing mechanism since it is necessary to provide a mechanism for driving a condenser lens and a reflector mirror and a space in which the condenser lens and a reflector are movable along an optical axis. As a result of this, the accessory zoom flash unit which is to be mounted on a flash shoe of a camera is low in portability due to its large-size and the built-in flash which is disposed in the camera invites large-size of the whole of the camera, complication of a pop-up mechanism for preventing a red-eye effect which will be described below and a short length of the pop-up (height) movement due to the complication of the pop-up mechanism.

Considering the performance of the current zoom flash, there are restrictions imposed on largely changing the flash illumination angle by moving the condenser lens or the reflector mirror in the direction of an optical axis within a restricted space. The range of the flash illumination angle which may be changed without generating irregularly distributed light spots and lowering of the light amount at the periphery of a picture plane is limited in such a manner that the guide number converted from the illumination brightness in the center of the picture plane at a narrow illumination angle is about 1.2 to 1.3 times that at a wide illumination angle.

The recent high magnification zoom lens has a tendency that the f-number at a full aperture on the telephoto side is approximately one step larger than that on the wide-angle side for miniaturization. However, in general a distant object is often photographed on the telephoto side. As a result of this, it is uneasy to use a camera when a recent zoom-flash is used since the object distance at which flash photography is possible at a proper light amount is shorter on the telephoto side than on the wide angle side.

If the illumination angle of the flash is largely changed without generating irregularly distributed light dots and lowering the light amount at the peripheral area of the picture frame, it would be necessary to dispose a number of magnification variable condenser lenses in front of the flash reflector mirror. As a result of this, loss of the amount of light will increase due to transmission of light through a number of lenses and the volume necessary for the condenser lens will also increase so that the zoom flash unit will not become practical.

SUMMARY OF THE INVENTION

Therefore, it is an object of the present invention to provide a compact flash device for a camera having a simple mechanism which is capable of largely changing the illumination angle of the flash light-emitting portion in response to the focal length of a taking lens and in which the size of the electric circuit for the flash device is reduced.

It is another object of the present invention to provide a compact flash device for a camera having a simple mechanism, which is capable of largely changing the illumination angle of the flash in response to the focal length of a taking lens and is capable of generating a high guide number flash and is capable of reducing the occurrence of red-eye phenomenon.

In an aspect of the present invention, there is provided a flash device for a camera comprising: a plurality of flash light emitting portions having different flash illumination ranges; and control means responsive to the focal length of a taking lens of the camera for selectively firing one of the plurality of flash light emitting portions.

The control means may select a flash light emitting portion of a plurality of the flash light emitting portions, having a wide flash illumination range for firing the same when an object distance is smaller than a given distance.

The flash device for a camera may further include single power supply means for supplying electric power to a plurality of the flash light emitting portions; and a plurality of trigger means for activating each of a plurality of the flash light emitting portions to fire the same. The control means is adapted to select one of the trigger means to fire one of the plurality of the flash light emitting portions.

A flash light emitting portion of a plurality of the flash light emitting portions having a narrower illumination range may be disposed at a position farther from an optical axis of the taking lens than the other flash light emitting portions.

A plurality of the flash light emitting portions may be juxtaposed in a linear direction which perpendicularly intersects an optical axis of the taking lens.

A plurality of the flash light emitting portions may be juxtaposed in a height direction of a body of the camera.

A plurality of the flash light emitting portions may be enabled to emit light when they are in a position extending from the upper surface of the camera body.

The control means may obtain focal length information from a focal length detecting means disposed at the taking lens.

The control means may obtain object distance information from means for detecting a focussed position of a taking lens.

A flash light emitting portion of a plurality of said flash light emitting portions, having a wider flash illumination range may be disposed at a position farther from an optical axis of the taking lens than the other flash light emitting portions.

In another aspect of the present invention, there is provided a method of controlling light emission of a plurality of flash light emitting portions of a flash device having different illumination ranges comprising the steps of: determining whether or not the flash light emitting portions are enabled to fire; determining whether or not the focal length of a taking lens is longer than a given focal length; selecting a flash light emitting portion having a smaller flash illumination range for firing the same when the focal length is longer than a given focal length; and selecting a flash light emitting portion having a wider illumination range for firing the same when the focal length of the taking lens is shorter than a given focal length.

The method may further include a step for selecting a flash light emitting portion having a wide illumination range for firing the same when the focal length of the taking lens is longer than a given focal length and the object distance is smaller than a given distance.

BRIEF DESCRIPTION OF THE DRAWINGS

These and other objects, features and advantages of the invention will become more apparent upon a reading of the following detailed specification and drawing, in which:

FIGS. 5(A) and 5(B) are development views showing the distance encoder of the camera of FIG. 1 when an object to be photographed is at a distance farther and closer than a given short distance, respectively;

FIGS. 6(A) and 6(B) are longitudinal sectional views showing the flash device for the camera of FIG. 1, which is retracted and popped-up, respectively;

FIG. 7(A) is a horizontal sectional view showing the telephoto flash portion of the camera shown in FIG. 1;

FIG. 7(B) is a sectional view taken along the line D—D in FIG. 7(A);

FIGS. 11(A) and 11(B) are flow charts showing a program of a photographing sequence for the camera in FIG. 1;

FIG. 16(A) is a front view showing a fourth embodiment of a flash device of the present invention which is incorporated in a lens shutter camera;

FIG. 16(B) is a sectional view of the camera taken along the line E—E in FIG. 16(A); and FIG. 17 is a schematic view block diagram explaining the principle of the present invention.

DETAILED DESCRIPTION OF THE PREFERRED EMBODIMENTS

The present invention will be described with reference to the drawings.

Figure 1:
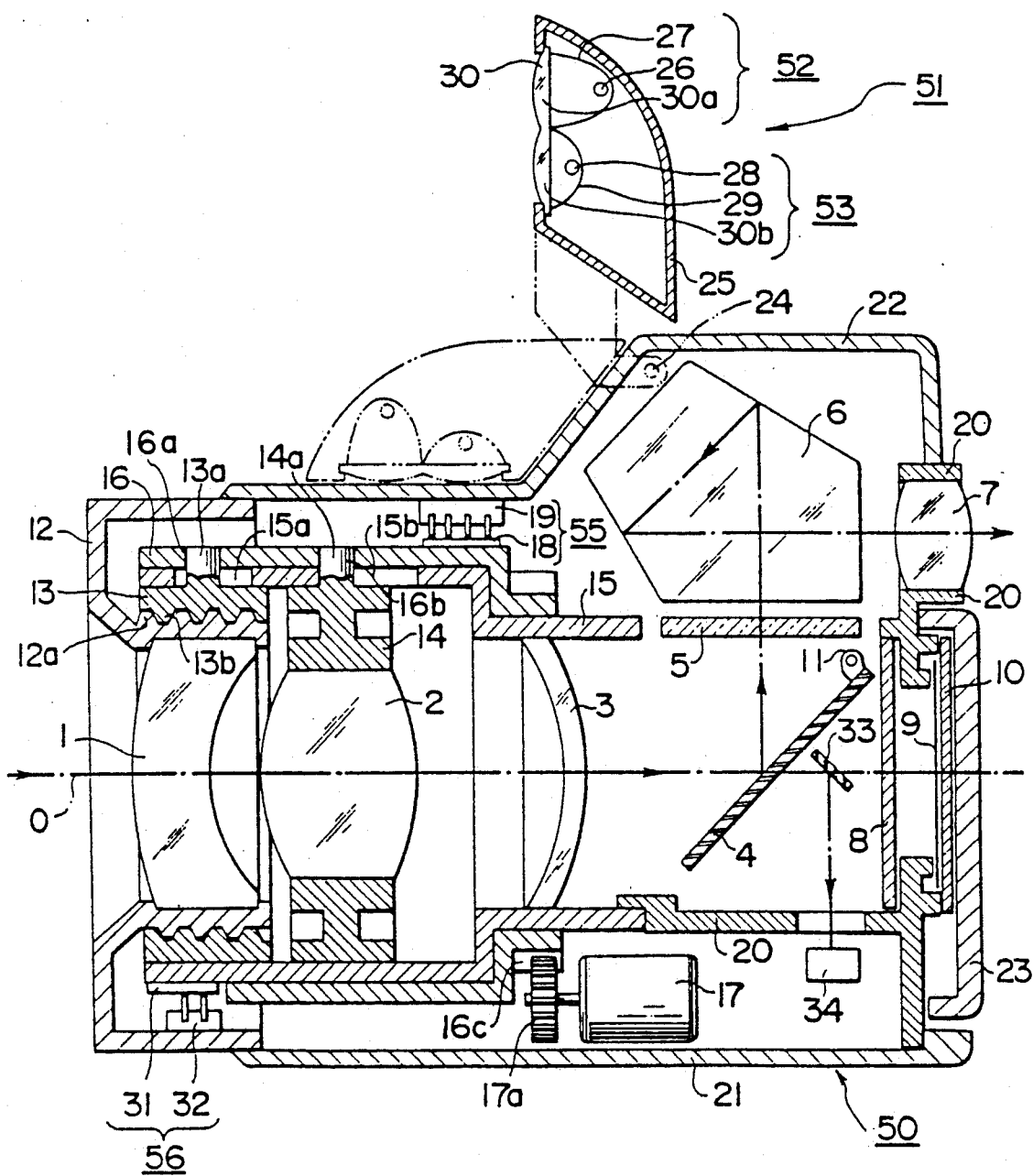
FIG. 1 is a longitudinal sectional view showing a first embodiment of a flash device which is incorporated in a single-lens reflex camera having a taking lens which is a single-lens reflex camera having a taking lens which is zoomed to a wide-angle side.

Referring now to FIG. 1, there is shown a longitudinal sectional view illustrating a single lens reflex camera having a built-in flash device which is a first embodiment of the present invention. The camera 50 comprises a main body 20, a lower cover 21, an upper cover 22, a rear lid 23, a zoom lens-barrel assembly, a flash device 51 having two flash light emitting portions disposed on the upper cover 22, a movable reflex half mirror 4 journalled on a mirror shaft 11, a view finder system including a focusing screen 5 above the mirror 4, a pentaprism 6 and an eye piece lens 7, a focal plane shutter 8 disposed behind the half mirror 4, a pressing plate 10 disposed on the rear lid 23 for pressing the film 9, a movable auxiliary mirror 33 obliquely disposed on the rear side of the half mirror 4, a focusing sensor 34 disposed below the mirror 33 for detecting a focal point based on the light reflected from the auxiliary mirror 33, and a zoom encoder 55, a distance encoder 56 and an electronic control unit such as CPU 150. (see FIG. 8).

The half mirror 4 is disposed obliquely at an angle of 90° to the optical axis O when the view is observed via the view finder. The half mirror 4 reflects the light flux transmitted through a taking lens system including a focusing lens 1, a varifocal lens 2 and a relay lens 3 onto the focusing screen 5 and simultaneously transmits a part of the light flux and projects it upon the focusing sensor 34 via the auxiliary mirror 33. The light flux transmitted through the focusing screen 5 and the pentaprism 6 is observed through the eye piece 7 as a correctly oriented view. Each of the half mirror 4 and the auxiliary mirror 33 are moved upwardly to a position offset from the light path of the light flux during exposure.

The zoom lens-barrel assembly comprises a stationary frame 15 secured to the main body 20 which supports the relay lens 3 and has linear grooves 15a and 15b, a cam frame 16 which is rotatably fitted on the outer periphery of the stationary frame and has lens driving cam grooves 16a and 16b on the outer periphery thereof and a driving gear 16c on the outer periphery of the rear part thereof, an intermediate barrel 13 slidably fitted in the inner periphery of the stationary frame 15 and having a helicoid screw 13b, an engagement pin 13a secured to the intermediate barrel 13 and fitted into the cam groove 16a and the linear groove 15a, a lens frame 12 having a helicoid screw 12a threadably engaged with the helicoid screw 13b and having a focusing lens 1 secured to the inner periphery thereof, a lens frame 14 having the variator lens 2 secured to the inner periphery thereof, which is disposed between the focusing lens 1 and the relay lens 3, and an engagement pin 14a secured to the lens frame 14, which is fitted in a cam groove 16a and a linear groove 15b. The gear 16c of the cam frame 16 is meshed with a gear 17a secured to an output shaft of a zoom motor 17. Rotation of the zoom motor 17 causes the cam frame 16 to be driven to perform zooming.

The zoom encoder 55 comprises a zoom encoder pattern 18 and a zoom encoder switch 19. The zoom encoder pattern 18 including an electrically conductive pattern 18a and an insulating pattern 18b (see FIG. 2) is disposed around the outer periphery of the rear part of the cam frame 16. The encoder switch 19 is secured to the upper cover 22 so that it corresponds to the position of the encoder pattern 18. A common contacts 19a and contact 19b, 19c and 19d are in sliding contact with the pattern 18. Zooming signals are outputted from the encoder switch 19 in response to the zooming operation.

Figure 2:
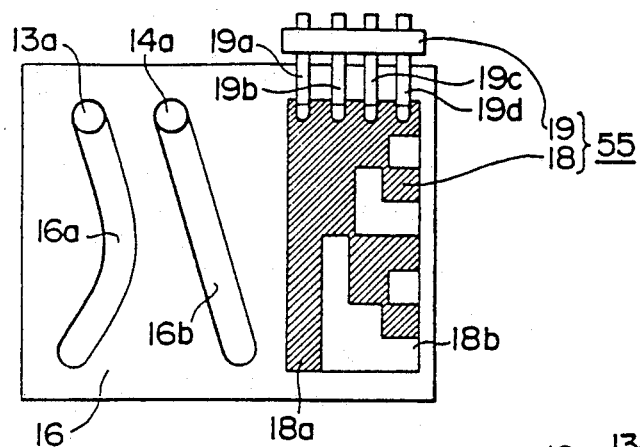
FIG. 2 is a development view showing a main part of a zoom encoder and a cam frame in the camera of FIG. 1, which is zoomed to a wide-angle side.

The zooming operation of the lens-barrel assembly will be described with reference to FIGS. 1 to 4. FIG. 1 shows a zooming lens which is in a wide angle position, that is, on the side of a short focal point. FIG. 2 is the development view showing the cam frame 16 which is in a wide angle position. In order to zoom the lens to a wide angle position, the cam frame 16 is rotated in a clockwise direction as viewed from an object to be photographed. The engagement pins 13a and 14a are driven in an axial direction by the cam grooves 16a and 16b of the cam frame 16 while being guided with the linear grooves 15a and 15b for moving the focusing lens 1 and the variator lens 2 to a given wide angle zoom position to complete the zooming to a wide angle position. Simultaneously, each contact of the zoom encoder switch 19 is relatively moved to slide along the encoder pattern 18 so that the encoder 55 outputs an encoded output corresponding to the wide angle position of the lens.

Figure 3:
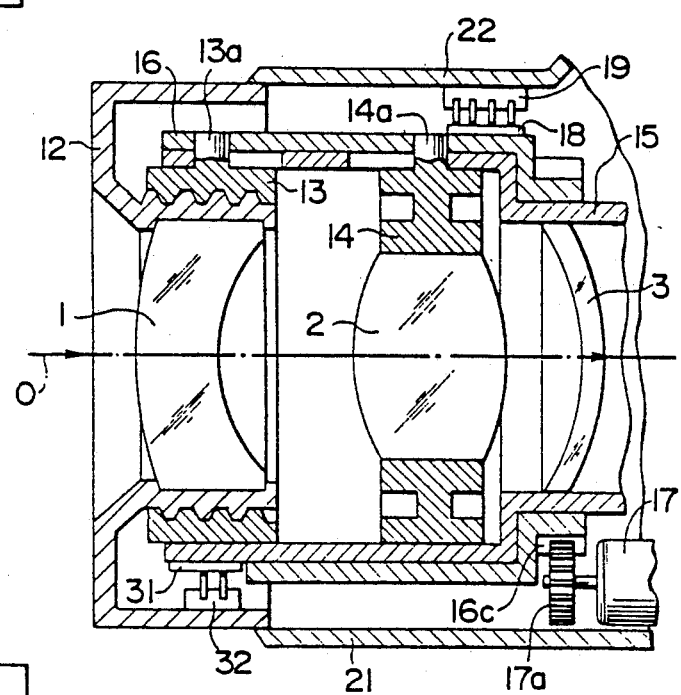
FIG. 3 is a longitudinal sectional view showing a lens-barrel assembly in the camera of FIG. 1, which is zoomed to a telephoto side.
Figure 4:
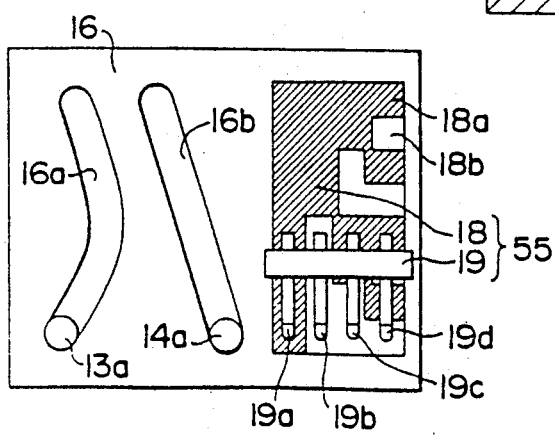
FIG. 4 is a development view showing a main part of the zoom encoder and the cam frame in the camera of FIG. 1, which is zoomed to a telephoto side.

Referring now to FIGS. 3 and 4, there are shown a longitudinal sectional view of the lens-barrel assembly which is in a telephoto or long focal position and a development view of the cam frame which is in the long focal position, respectively. In order to zoom the lens to the telephoto or long focal position, the cam frame 16 is rotated in a counterclockwise direction as viewed from an object to be photographed. The rotation of the cam frame 16 causes the engagement pins 13a and 14a to be driven while being linearly guided for moving the focusing lens 1 and the variation lens 2 to a given telephoto position to complete the zooming to a telephoto position. As is similar to wide angle zooming, each contact of the zoom encoder switch 19 is relatively moved to slide on and along the encoder pattern 18 so that encoded outputs corresponding to the telephoto position are generated from the encoder 55.

The distance encoder 56 comprises a distance encoder pattern 31 and a distance encoder switch 32. The distance encoder pattern 31 including a conductive pattern 31a and an insulating pattern 31b (see FIG. 5(A)) is disposed around the outer periphery of the front portion of the stationary frame 15. The distance encoder switch 32 is secured to the lens frame 12 at such a position that the switch 32 corresponds to the pattern 31. The common contact 32a and the contact 32b of the switch 32 are in sliding contact with the pattern 31 so that distance encode data are outputted from the switch 32.

Focusing is carried out by driving the lens frame 12 by means of a focusing motor (not shown) in response to the output of the focusing sensor 34. Focusing may be carried out in a manually focusing type of camera in which the lens frame 12 is manually rotated. The operation of the distance encoder 56 which detects a given short distance $L_1$ of an object to be detected by the afore-mentioned focusing will be described. A word "short distance $L_1$" means a given limit of distance at which a flash can reach. The details of the distance $L_1$ will be described hereafter. The distance encoder switch 32 relatively slides on and along the distance encoder pattern 31 when the lens frame 12 is rotated. The contact 32b of the encoder switch 32 slides along the insulating pattern 31b as shown in FIG. 5(A) when the object distance is normal. It is assumed that the common contact 32a of the encoder switch 32 normally slides on and along the conductive pattern 31a. Accordingly an OFF signal is outputted from the encoder switch 32. The focusing lens 1 is displaced by rotating the lens frame 12. When the object distance becomes equal or less than the given short distance the contact 32b will also slide on the conductive pattern 31a as shown in FIG. 5(B). This will cause the encoder switch 32 to output an ON signal. Based on this ON signal, the condition that the object distance $L_1$ has become not higher than $L_1$ may be detected.

The flash device 51 will be described with reference to FIGS. 1 and FIGS. 6(A) and 6(B), which show the flash device which is popped up and retracted, respectively. The flash device 51 comprises a flash casing 25 journalled on a popped-up shaft 24 at the end of the case arm 25a, a front window 30 which is integrally formed with condensor lenses 30a and 30b, a telephoto flash light emitting portion 52 which is one of the light emitting portions and a wide angle flash light emitting 53 which is the other light emitting portion. A pop-up shaft 24 is mounted on the upper case 22 and is inserted into a coil portion of a pop-up spring 35 which is a torsion spring. The spring 35 is engaged with the inner surface of the upper cover 22 at the one end of the hook part and is engaged with a projection 25c of the case arm 25a at the other end thereof, so that the spring biases the case 25 in a pop-up direction. An engagement lever 37 for holding the flash case 25 at a retracted position is pivotally mounted on the upper cover 22. The engagement lever 37 has an engagement hook 37a at the front end thereof and is biased in a counterclockwise direction by means of a locking spring 36. The engagement hook 37a is engaged with an engagement pin 25b provided on the flash case 25 so that it can hold the flash device 51 at a retracted position by the biasing force of the locking spring 36 (refer to FIG. 6(A)).

When the engagement lever 37 is rendered disengaged with the arm 25a, the case 25 will swing to the pop-up position at which the flash device 51 may be used under the action of a biasing force of the pop-up spring 35 (refer to FIG. 6(B)).

An operation for disengaging the engagement lever 37 is carried out by manually or automatically sliding a release button 38 and rotating the engagement lever 37 in a clockwise direction. In order to move the flash device 51 into a retracted position, the flash case 25 is swung in a counterclockwise direction against the pop-up spring 35 to engage the engagement pin 25b of the casing with the hook 37a of the engagement lever 37.

A pop-up position detection switch 40 is disposed on the upper cover 22 for detecting whether the flash device 51 is in a pop-up position or in a retracted position. A depression member 39 for actuating the switch 40 is slidably supported on the upper cover 22 in an actuation direction of the case arm 25a. The detection switch 40 has contacts 40a and 40b. When the flash device 51 is popped-up as shown in FIG. 6(B), the depression member 39 is not biased, that is, free. The contacts 40a and 40b are in contact with each other by a self-biasing force so that they are kept electrically conductive. Accordingly, the detection switch 40 outputs an ON signal. When the flash device 51 is retracted, the switch contact 40a is biased via the depression member 39 by the case arm 25a so that the contact 40a is separated from the contact 40b. The detection switch 40 outputs an OFF signal.

When the telephoto and wide angle light emitting portions 52 and 53 which are incorporated in the flash device 51 are popped up, the telephoto flash light emitting portion 52 is in a position farther from the optical axis O of the camera than the wide angle flash light emitting portion 53. The telephoto flash light emitting portion 52 has an illumination angle which covers an angle of view on the side of a focal length longer than a given focal distance. The telephoto flash light emitting portion 52 comprises a flash tube 26, a reflector 27 which covers the afore-mentioned illumination angle, and a condenser lens 30a which is formed integrally with the front window 30. The wide angle flash light emitting portion 53 has an illumination angle which covers an angle of view on the side of focal length shorter than a given focal length. The wide angle flash light emitting portion 53 comprises a flash tube 28, a reflector 29 which covers the afore-mentioned illumination angle, and a condenser lens 30b which is formed integrally with the front window 30.

Mounting of the telephoto flash light emitting portion 52 will be described in detail with reference to FIGS. 7(A) and 7(B) which are a horizontal sectional view taken along the illumination optical axis of the light emitting portion and a sectional view taken along a line D—D in FIG. 7(A), respectively. The reflector 27 which is positioned with respect to the condenser lens 30a is formed with holes 27a at the horizontal opposite ends thereof. The flash tube 26 is inserted into the holes 27a. An elastic member 48 having insertion holes into which the flash tube 26 is pressure-inserted at positions corresponding to the holes 27a is mounted on the reflector 27. The flash tube 26 is fitted into both holes 27a of the reflector 27 and the insertion holes when the flash tube 26 is fitted in such manner. The flash tube 26 is held in close contact with the bottom of the reflector 27 by means of the elastic member 48.

A secondary lead 42 of a trigger coil or transformer 41 is electrically connected with the reflector 27 via an electrically connecting member 43. A ground side lead 45 of the trigger coil 41 and a cathode lead 46 are connected to a cathode terminal of the flash tube 26. An anode side lead 47 is connected with an anode terminal of the tube 26. A trigger pulse generated from the trigger coil 41 is applied to the flash tube via the reflector 27 to trigger the firing of the flash tube. In the present embodiment, the trigger coil 41 is disposed in the flash case 25 so that the high voltage induced in the secondary lead 42 of the trigger coil 41 will not have an adverse effect on the control circuit in the camera body 20.

Since mounting of the wide angle flash light emitting portion 53 is substantially identical with the telephoto light emitting flash portion, the description of the wide angle flash light emitting portion 53 will be omitted for purposes of simplicity.

Figure 8:
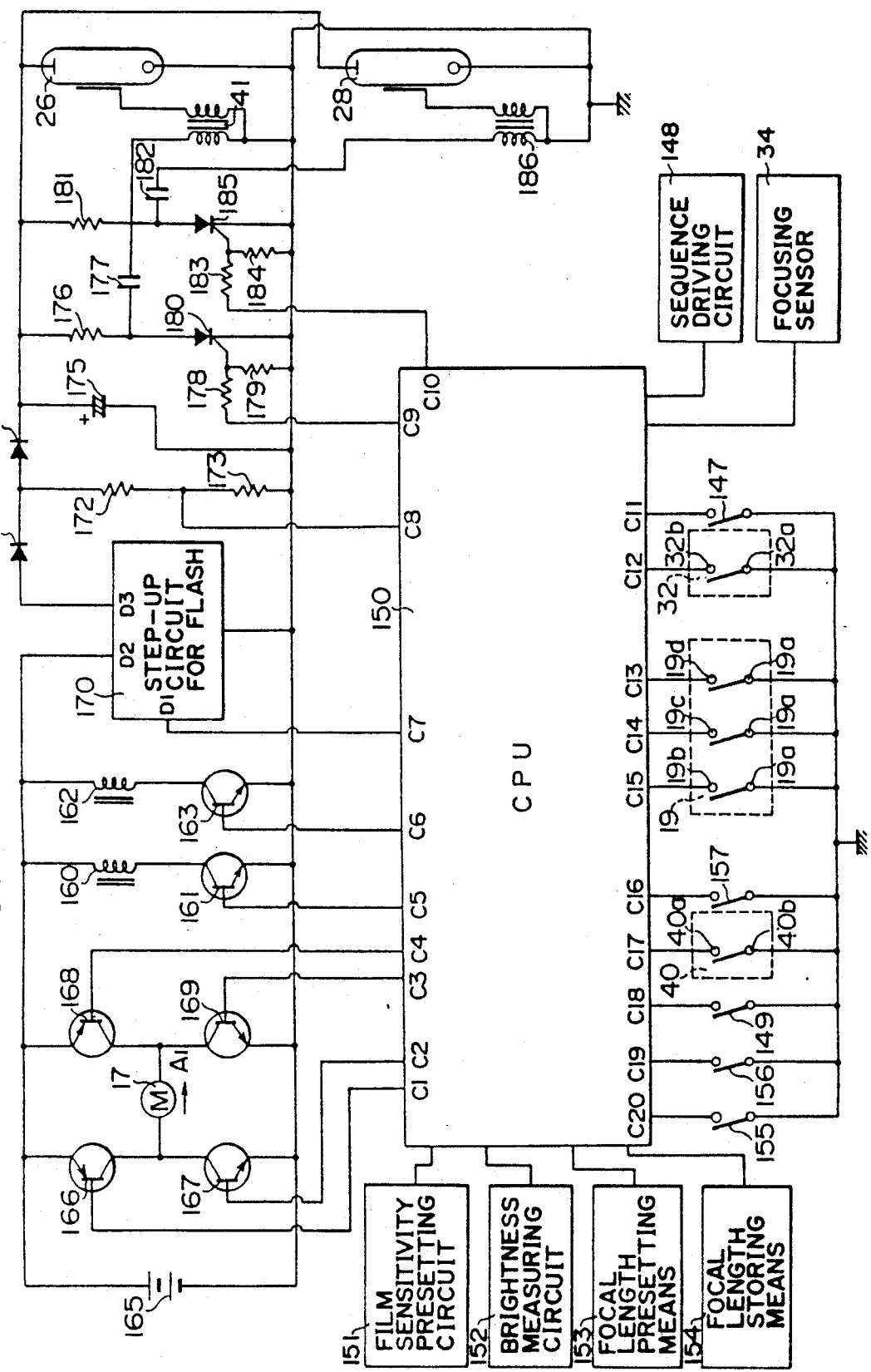
FIG. 8 is a circuit diagram showing a main part of an electric circuit of a camera in FIG. 1.

The structure and operation of the electric circuit in the first embodiment will be described with reference to FIGS. 8 to 11. The essential part of the electrical circuit is shown in FIG. 8.

The operation of each circuit in the first embodiment is sequence-controlled by the CPU 150. A telephoto zoom switch 155 and a wide zoom switch 156 which are connected with input terminals C20 and C19 of the CPU 150, respectively are externally actuated switches for performing the zooming operation of the taking lens. When the telephoto zoom switch 155 is turned on, the CPU 150 determines that operation of zooming to a long focal point is instructed, and renders the output terminals C1 and C3 "L" and "H" levels, respectively. Since transistors 166 and 169 are then rendered conductive, an electric current which flows from a battery 165 in a direction of arrow A1 causes a zoom motor M to rotate in a normal direction for performing a zooming operation to a long focal point. This zooming operation continues until the zoom switch 155 is turned off or until the CPU 150 detects at the input terminals C13, C14 and C15 that all the connections between the contacts 19b, 19c and 19d and the common contact 19a of the zoom encoder switch for detecting the state of the zoom encoder 55 (refer to FIG. 1) are made non-conductive when the taking lens is positioned at the longest focal position.

When the wide zoom switch 156 is turned on, the CPU 150 determines that the operation of zooming to a short focal point is instructed to render the output terminals C2 and C4 "H" and "L" levels, respectively. Since the transistors 167 and 168 are then rendered conductive, the zoom motor 17 is rotated in a reverse direction to perform a zooming operation to a short focal point. This zooming operation continues until the wide zoom switch 156 is turned off or when CPU 150 detects that the contacts of the zoom encoder switch 19 are turned on.

A release switch 149 which is connected with an input terminal C18 of the CPU 150 is an externally actuated switch. When the release switch 149 is turned on, the CPU 150 determines the releasing operation is instructed for perform the releasing operation. When the switch 40 which is connected with the input terminal C17 of the CPU 150, the CPU 150 will detect the pop-up state of the flash.

Electric magnets 160 and 162 for holding first and second curtains of the focal-plane shutter 8 (refer to FIG. 1) may be charged and held by rendering the output terminals C5 and C6 of the CPU 150 "H" level to turn on the transistors 161 and 163, respectively. Travel of first and second curtains is made possible by rendering the output terminals C5 and C6 of the CPU 150 turned on when the travel of the first curtain is completed. The CPU 150 can detect from the closing and opening of the X contact 157 whether or not the travel of the first curtain of the focal-plane shutter 8 is completed.

The distance encoder switch 32 (refer to FIGS. 1 and 5) including contacts 32a and 32b for detecting the state of the distance encoder is rendered conductive when the focal length of the taking lens is shorter than a given value. The CPU 150 can read at the input terminal C12 the turning on or off of the distance encoder switch 32.

A film sensitivity presetting means 151 can read the DX code of a film or manually can preset the film sensitivity. A photometric or brightness measuring circuit 152 measures the brightness of an object to be photographed. The focusing sensor 34 detects the object distance. Information on the film sensitivity, object brightness and object distance which are obtained from the above-mentioned means is inputted into the CPU 150.

A sequence driving circuit 148 is adapted to sequentially operate a driving mechanism for the movable mirror 4 and the auxiliary mirror 33 (both refer to FIG. 1), a known aperture driving mechanism, a shutter charging mechanism and a film winding mechanism in response to the signals from the CPU 150.

A focal length presetting means 153 presets a desired focal length by an external input. The CPU 150 stores the inputted focal length into a focal length storing means 154 and drives the zoom motor 17 to move the taking lens to the inputted focal length position stored in the focal length storing means 154 while monitoring the state of the zoom encoder 55 when a recall switch 147 connected with the input terminal C11 of the CPU 150 is turned on. Such an operation of the recall switch 147 makes it possible to shift the taking lens to the stored focal length position at a moment after a picture has been taken at the other focal length. If there is a focal length (normal focal length) at which pictures are frequently taken, such focal length is stored in the focal length storing means 154. Only depression of the recall switch 147 enables the taking lens to shift the normal focal length position at a moment. It is very convenient.

When the CPU 150 is rendered an "L" level at the output terminal C7 thereof the flash device voltage step-up circuit 170 will commence voltage step-up operation in response to the "L" level at the input terminal D1 thereof. The step-up circuit 170 activates a self-oscillator to generate a pulsated high voltage from a voltage of the battery 165, applied on a power source terminal D2. The high voltage from the step-up circuit 170 is rectified by a diode 171 and then voltage-divided by voltage dividing resistors 172 and 173 and is outputted from the terminal C8 of the CPU 150. Since the terminal C8 of the CPU 150 is an input terminal of an A/D convertor which is incorporated in the CPU 150, the charging voltage can be monitored from the result of the A/D conversion.

A main capacitor 175 stores the light emission energy for the flash. A diode 174 has a long reverse recovery time and is normally conductive for monitoring the charging voltage of the flash while the step-up circuit works. When the step-up circuit 170 does not work, there is no likelihood of leakage of the charge stored in the main capacitor 175 via resistors 172 and 173 since the diode 174 is non-conductive.

A trigger pulse generating circuit comprising resistors 176, 178, 179, a trigger capacitor 177, a thyristor 180 and a trigger coil 41 applies a pulsated high voltage on the telephoto flash tube. An electric charge is stored in the trigger capacitor 177 via the resistor 176. When an "H" level signal is outputted from a terminal C9 of the CPU 150, the thyristor 180 is rendered conductive. Accordingly, the electric charge stored in the trigger capacitor 177 is discharged to the primary winding of the trigger coil 41 via the thyristor 180. Since the number of turns of the secondary windings is larger than that of the primary windings, conduction of a current through the primary winding generates a high voltage at the secondary winding. The generated high voltage is applied to the flash tube 26. As a result of this, the flash tube 26 flashes by the charge stored in the main capacitor 175.

A flash tube 28 is a wide-angle flash light emitting tube. Resistors 181, 183, 184, a trigger capacitor 182, a thyristor 185 and a trigger coil 186 correspond to the resistors 176, 178, 179, the trigger capacitor 177, the thyristor 180, and the trigger coil 41, respectively, which form a trigger pulse generating circuit for the aforementioned flash tube 26. Accordingly, the flash tube 28 flashes similarly to the telephoto flash tube 26 when an "H" level signal is outputted from a terminal C10 of the CPU 150.

The zoom encoder is used for detecting the focal length of the taking lens in the first embodiment. Means for detecting the focal length including a photo-interrupter in lieu of the zoom encoder will be described with reference to FIGS. 9(A), 9(B) and 10.

Figure 9A:
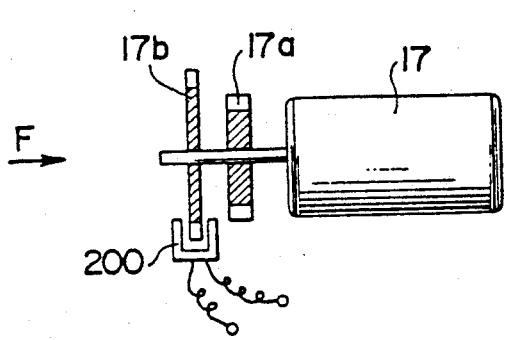
FIG. 9(A) is a longitudinal sectional view showing a variation of a focal length detecting means shown in FIG. 1.
Figure 9B:
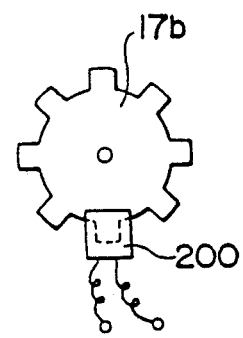
FIG. 9(B) is a view as viewed along an arrow F in FIG. 9(A)

The gear 17a is secured to the zoom motor 17 in FIG. 1 which shows the first embodiment of a single lens reflex camera while a rotor 17b is additionally secured to the motor in the FIG. 9(A). A photo-interrupter 200 detects the rotating state of the zoom motor 17. The comb-like rotor 17b and the photo-interrupter 200 are disposed as shown in FIG. 9(B). The amount of the rotation of the zoom motor 17 is detected based on a signal from the photo-interrupter 200.

Figure 10:
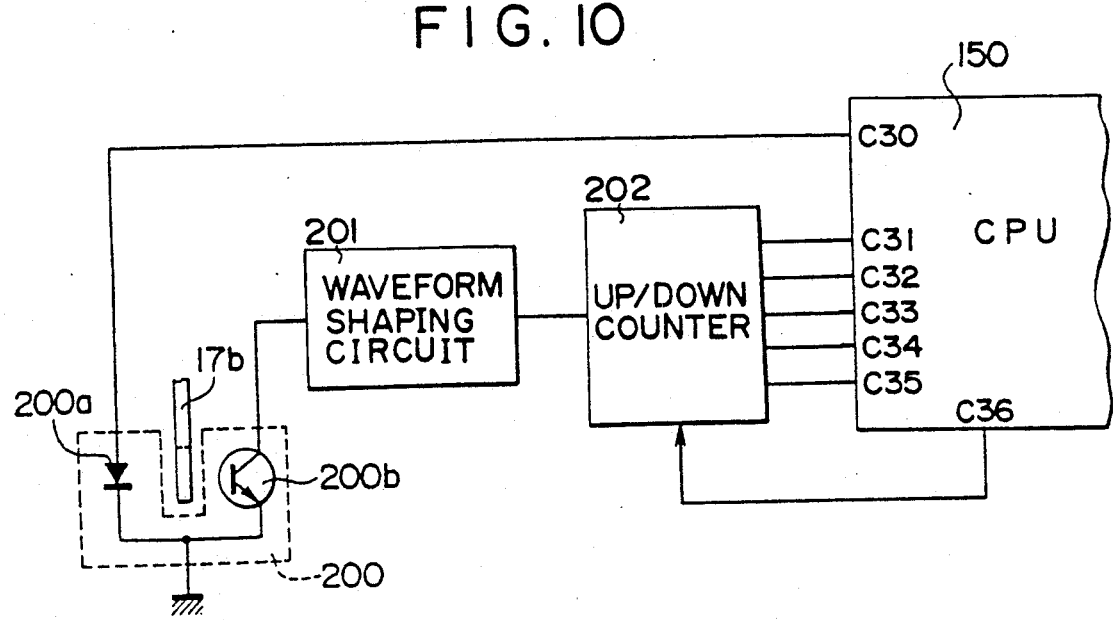
FIG. 10 is a circuit diagram incorporating the focal length detecting means in FIGS. 9(A) and 9(B)

FIG. 10 is a block diagram showing the photo-interrupter for detecting the focal length. A waveform shaping circuit 201 shapes the wave-form of a signal from the photo-interrupter 200 to output the shaped signal to an up/down counter 202. When the CPU 150 renders its output terminal C30 to the "H" level, an LED 200a which forms the photo-interrupter 200 will light. Then, the waveform shaping circuit 201 shapes the waveform of a signal current from the photo-transistor 200b to output a rectangular pulse to the up/down counter 202. The CPU 150 controls the output terminal C36 depending on the rotational direction of the zoom motor 17 to switch up/down counting of the counter 202. The CPU 150 reads the count value from the up/down counter 202 at input terminals C31 to C35. Since the count value corresponds to the focal length of the taking lens, the focal length may be detected without using a zoom encoder.

Detection means including the photo-interrupter is applicable to focus a multi-focus changing camera including a dual focus selection camera other than a camera having a zoom lens. The multi-focus changing camera usually has a presetting member which manually presets the focal length. The focal length is preset based on the information from the presetting member. One of the flash tubes may be selected based on the information from the presetting member which has been manually preset. One of the flash tubes may be selected without using an encoder and the like for detecting the focal length of the taking lens.

Figure 11A:
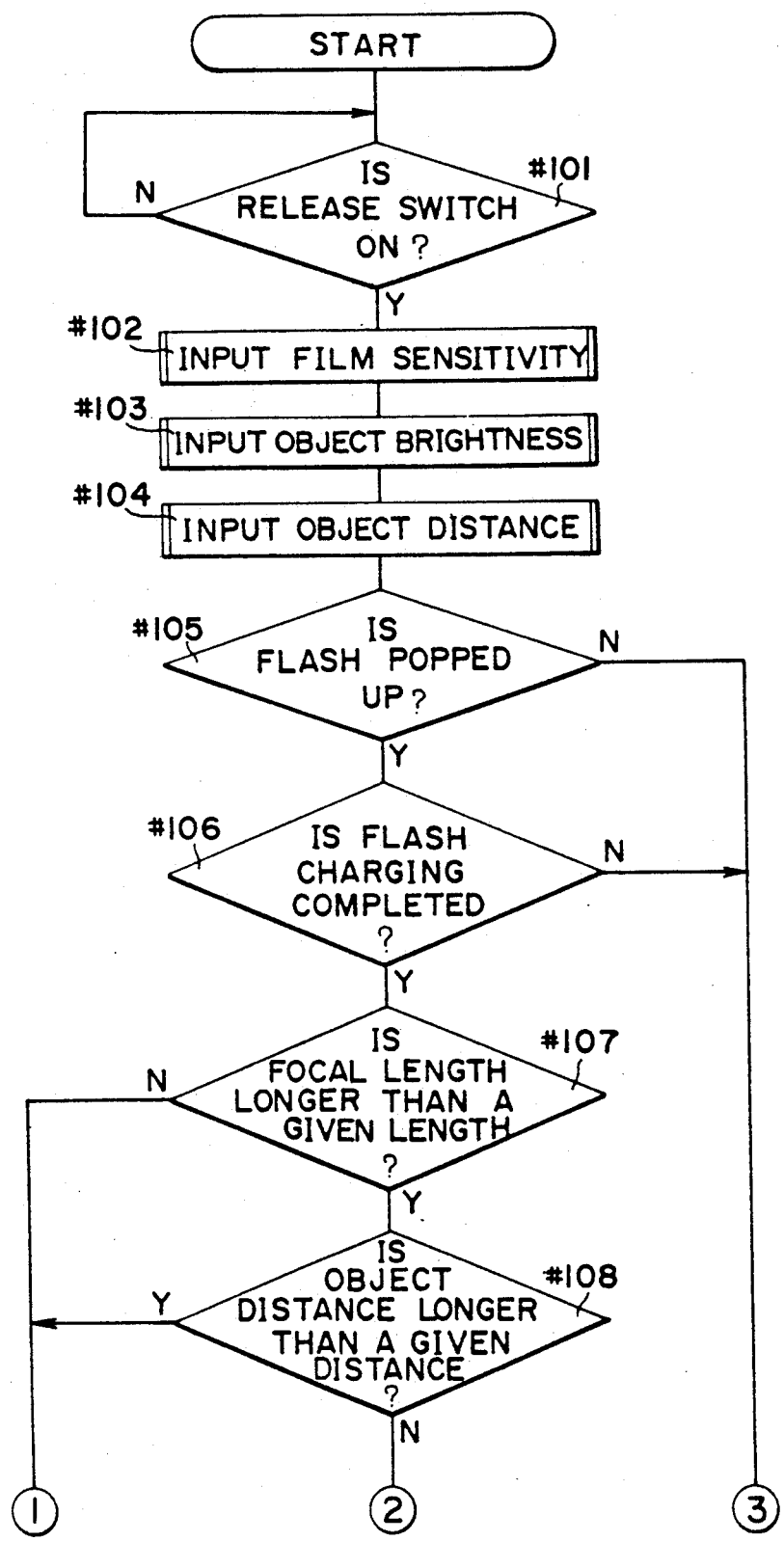

Photographic picture taking sequence in the first embodiment will be described with reference to flow charts of FIGS. 11(A) and 11(B).

The CPU 150 monitors the turning on or off of a release switch 149 at a step #101. If turn on of the release switch is detected, a picture taking operation is commenced and the program will consecutively proceed to the steps #102, #103 and #104. Film sensitivity information from a film sensitivity presetting means 151, object brightness information from a brightness measuring circuit 152, and object distance information from the focusing sensor 34 is inputted to the CPU 150 at steps #102, #103 and #104, respectively.

At a step #105, a switch 40 for detecting the flash pop-up state is checked. If the state that the flash is popped-up is detected, the CPU 150 determines that a photographer will intend to take picture with flash. It is checked whether charging of the main capacitor 175 for the flash is completed or not at a step #106. If the charging of the main capacitor 175 is completed, the CPU 150 will then determine that flash photography is possible, and will determine which of the telephoto and wide-angle flashes 52 and 53 (refer to FIG. 1) should be triggered as follows: The state of the zoom encoder is checked at a step #107. If the taking lens is positioned on the side of a focal point longer than a given focal length, the program will proceed to a step #108. At this step, the distance encoder 56 (refer to FIG. 1) is checked. If the object is located far from a given distance, the CPU 150 determines that the telephoto flash light emitting portion 52 will be fired to execute the program set forth in a step #109 and the subsequent steps. On the other hand, if it is determined that the taking lens is on the side of a focal point shorter than a given focal length at a step 107 and if the object is located on the side of distance longer than a given distance, the CPU 150 will then determine that the wide-angle flash light emitting portion 53 will be triggered to execute the program set forth in a step #120 and the subsequent steps. The reason why such a determination is made will be hereafter described with reference to FIG. 12.

If the CPU 150 determines that the telephoto flash light emitting portion 52 will be triggered, it presets the Av value of the aperture and the Tv value of shutter speed, which are determined by considering a guide number of the telephoto flash device. At a step #110, the CPU 150 feeds a signal to a sequence driving circuit 148 for moving up the movable mirror and controlling the aperture corresponding to the preset Av value. At a step #111, the electromagnet for holding the first curtain is turned off to travel the first curtain of the focal-plane shutter 8. A timer is started at a step #112. Closing or opening of the X contact 157 is checked at a step #113. If it is detected that the X-contact 157 is rendered closed by the completion of travel of the first curtain, the program will proceed to a step #114 at which the flash tube 26 of the telephoto flash light emitting portion 52 is triggered.

If the CPU 150 detects that the timer has counted out the preset Tv value at a step #115, the program will proceed to a step #116 at which the second curtain holding electromagnet 162 is turned off. Then the second curtain of the focal-plane shutter 8 travels and the timer is reset at a step #117. Finally at a step #118 the CPU 150 applies a signal to a sequence driving circuit 148 to move down the movable mirror and to return the aperture to a released position and to charge a focal-plane shutter and to wind a film by one-frame for completing a series of photographic operations.

If the CPU 150 determines at steps #107 and #108 that the wide-angle flash light emitting portion 53 is triggered, the CPU 150 then presets the Av value and the Tv value which are determined by considering the guide number of the wide-angle flash light emitting portion 53. After the CPU 150 executes the program as set forth in steps #121 to #124 similar to steps #109 to #113, the flash tube 28 of the wide-angle flash light emitting portion 53 is triggered at a step #125. Thereafter a program set forth in the steps #115 and the subsequent steps is executed to complete a series of photographic operations.

If the CPU 150 detects at the step #105 that the flash is not popped up, it determines that the photographer intends normal photography without using flash, and executes the program of normal photography set forth at the step #130 and the subsequent steps. If the CPU 150 detects at the step 106 that the charging of the capacitor is not completed, it also determines that flash photography is impossible and executes the program of the flow chart at the step #130 and the subsequent steps. After the CPU presets Av and Tv values which are optimal for usual photography at the step #130 and executes the operation at steps #131 to 133, then it executes the program set forth in the flow chart at the step #115 and the subsequent steps for completing a series of photographic operations.

If a desired focal length is preset by an external operation using the focal length presetting means 153, or if the lens is moved to a position to provide a focal length stored in the focal length storing means by manipulating a recall switch 147, determination of change-over between the telephoto and wide-angle flash light emitting portions 52 and 53 may be carried out by using a value stored in the focal length storing means 154 at a step #107.

Determination of change-over of either flash light emitting portions may be carried out at a step #108 by detecting the output of the focusing sensor 34 instead of detecting the state of the distance encoder 56. The operation of the circuit in the first embodiment has been described hereinabove.

Figure 12A:
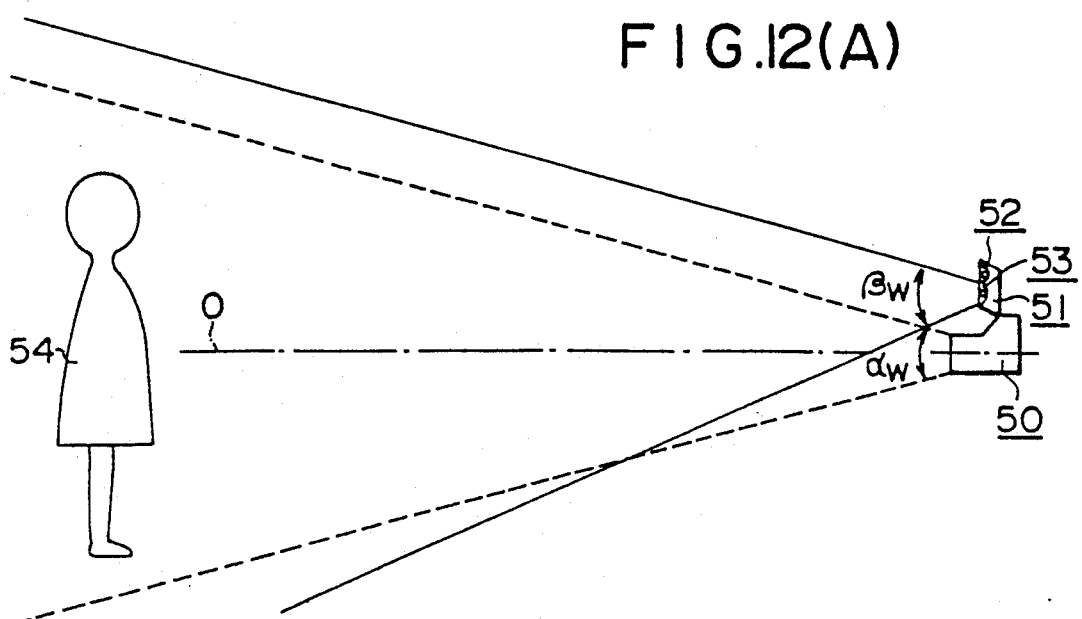
FIGS. 12(A) and 12(B) are schematic views showing the relation between the photographing angle and the flash illumination angle on wide-angle and telephoto respectively.
Figure 12B:
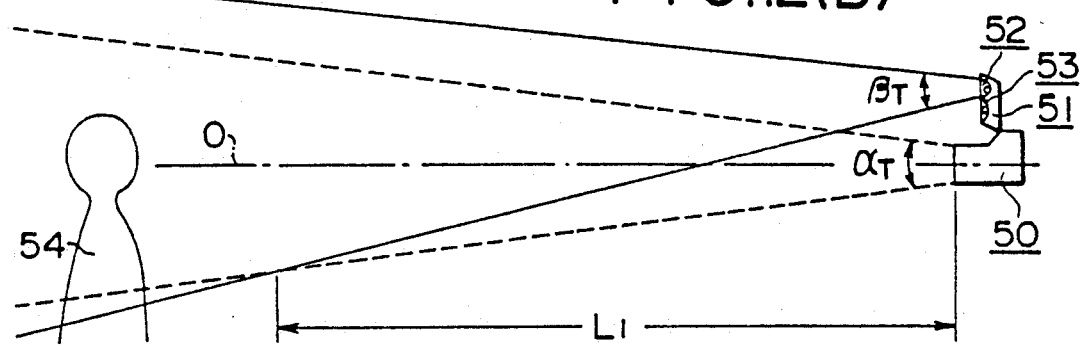

Control of flash light emission in the photographic sequence will be described with reference to the FIGS. 12(A) and 12(B) showing the relation between the angle of view of the taking lens and the flash illumination angle.

FIG. 12(A) shows a flash photography in which the taking lens of the camera 50 is preset to provide a wide-angle, that is, a short focal length. In this case, it is necessary to provide a wide angle of view $\alpha_w$ of the taking lens and for the flash device 51 to illuminate the wide angle of view $\alpha_w$. Accordingly, the afore-mentioned sequence is controlled to fire the wide-angle flash light emitting portion 53 having a wide illumination angle $\beta_w$ corresponding to the angle of view $\alpha_w$. This enables the flash device 51 to illuminate the whole of the object 54 with flash light.

FIG. 12(B) shows a flash photography in which the focal length of the taking lens of the camera is preset on the telephoto side, that is, the long focal length side. There is a tendency that the distance between the object 54 and the camera is longer when the taking lens is on a telephoto side than when the taking lens is on a wide-angle side. Hence, a flash illumination having a higher guide number is required when the lens is zoomed to a wide angle side than when the lens is zoomed to a telephoto side. Since the angle of view $\alpha_T$ is narrow when the taking lens is zoomed to the telephoto side in the present embodiment, the photographic sequence is controlled so that the telephoto flash light emitting portion 52 providing a narrow illumination angle $\beta_T$ is triggered when the taking lens is on the telephoto side. Using the telephoto flash light emitting portion 52 having a narrow illumination angle makes it possible to remarkably increase the guide number more by consuming the same energy amount than when the wide-angle flash light emitting portion 53 is used. Accordingly the object 54 to be photographed which is at a far distance may be illuminated with sufficient bright flash light.

Figure 13:
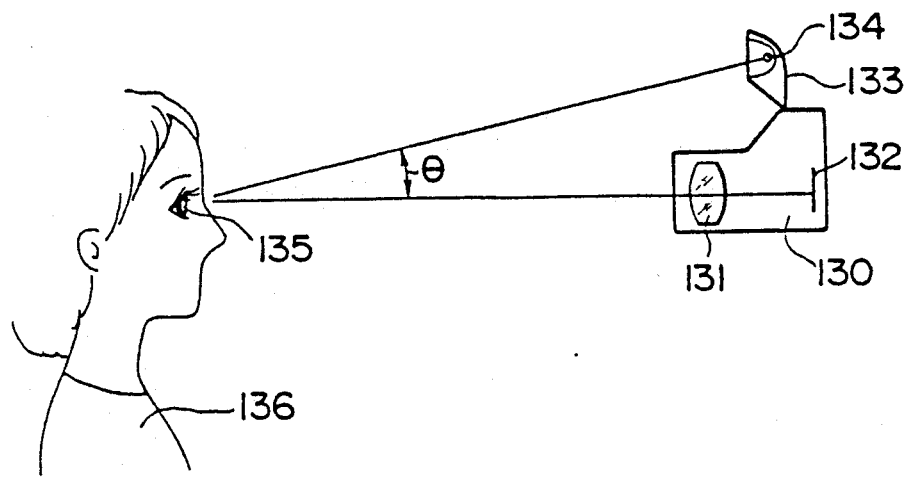
FIG. 13 is an elevational view explaining red-eye phenomenon which occurs in usual flash photography.

When the flash device is popped up as described above, the telephoto flash light emitting portion 52 is disposed in a position farther than the wide angle light emitting portion 53 from the optical axis O for preventing the red-eye effect from occurring on flash photographing. Referring now to FIG. 13, there is shown a side view showing a portrait photography using a flash. Light emitted from the light emitting portion 134 of the flash device 133 is reflected on the pupil of a person 136 which is an object to be photographed and is transmitted through a zoom taking lens of a camera 130 and is imaged on a film 132. Generally red-eye phenomenon will more readily occur when the angle between a line passing through the light emitting portion 134 and the pupil 135 and a line passing through the pupil 135 and the taking lens 131 is small.

Figure 14A:
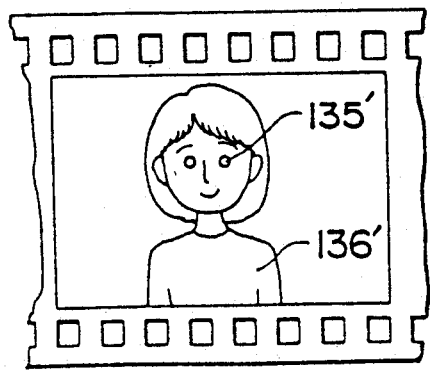
FIGS. 14(A) and 14(B) are views showing an image in a frame on flash telephoto and wide-angle photography in FIG. 13, respectively.
Figure 14B:
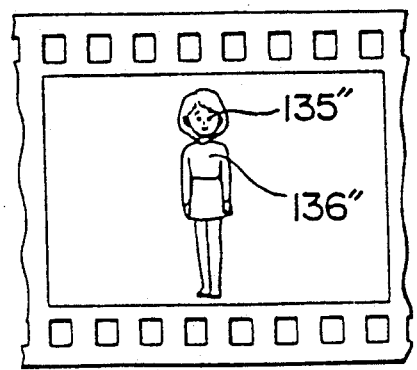

Therefore, if the distance between the camera and the object person 136 is same and the positional relation between the taking lens 131 and the light emitting portion is same, that is, the angle $\theta$ is constant, the likelihood of occurring of a red-eye phenomenon does not change. However, if a picture is taken on the telephoto side in which the focal length of the taking lens 131 is preset longer, a pupil image 135' of the portrait 136' would occupy a large area on the film as shown in FIG. 14 (A). If a red-eye phenomenon occur, the red-eye on the film or print would become very prominent.

On the contrary, if a picture is taken on the wide angle side in which the focal length is preset short, the pupil image 135" of the portrait 136" would occupy a small area on the film. Red-eye will not be very prominent ever if it will occur. Accordingly, presetting the angle $\theta$ to a large value is more advantageous on the wide angle side than when a photographing is conducted on the telephoto side in which the focal length is longer. On general portrait photography, the telephoto lens is more frequently used than the wide-angle lens when the object distance is long. Accordingly, a constant separate distance between the light emission portion 134 and the optical axis of the lens 131 is disadvantageous from the view point of red-eye phenomenon since the aforementioned angle $\theta$ is small.

The telephoto flash light emitting portion 52 is disposed at a position farther from the optical axis O than the wide angle flash illumination portion as mentioned above in the present embodiment, so that the angle $\theta$ is made larger under a condition that the telephoto flash emitting portion 52 is fired for reducing the occurrence of the red-eye phenomenon. If the object distance is shorter than a given value $L_1$, the wide-angle flash illumination portion 53 will be fired even when the taking lens is preset on the long focal length side, that is, the telephoto side. In this case, the object is close to the camera to provide a large angle $\theta$. Accordingly, a red-eye phenomenon will not occur. It is assured that the same countermeasure for the red-eye phenomenon be taken in the other embodiments which will be described below.

Figure 12C:
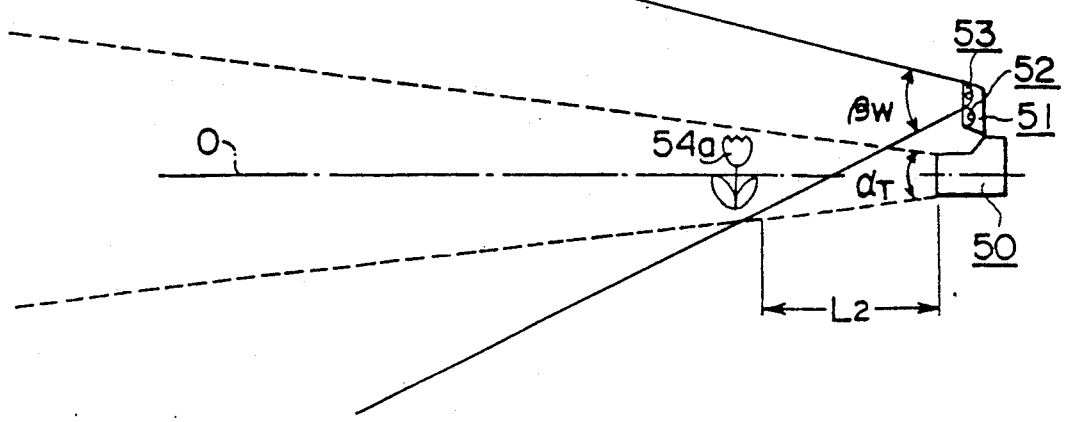
FIG. 12(C) is a schematic view of a second embodiment showing the relation between the photographing angle and the flash illumination angle on close-up photography when the flash light emitting portion having a wide flash illumination angle is used.

Referring now to FIG. 12(C), there is shown a second embodiment of the present invention in which the wide angle flash light emitting portion 63 is disposed in a position farther from the optical axis O of the camera than the telephoto flash light emitting portion 52. The focal length of the taking lens of the camera 50 is preset to the telephoto side, that is, a long focal length side and the object to be photographed 54a is at a short distance $L_2$. A plant and the like is photographed by using a flash at a high magnification. If the telephoto flash light emitting portion 52 is fired in the first embodiment, a dead zone in which an object is not exposed to flash light would occur at a lower area of the picture frame or flash light would be eclipsed by the tip end of the lens barrel when the distance between the object and the camera is shorter than a given distance $L_1$ as shown in FIG. 12(B). In order to avoid the former phenomenon, widening of the telephoto illumination angle $\beta_T$ may be possible. Widening of the angle $\beta_T$ invites the lowering of the guide number of the telephoto flash device 52. A high guide number is not necessary if the object distance is shorter than a given distance $L_1$ in the present embodiment. Control is made by the aforementioned photographic sequence so that a wide-angle flash light emitting portion 53 which is disposed at a position farther from the optical axis is fired independently of the preset focal length of the taking lens. This makes it possible to expose to flash light the object 54a which is at a distance $L_2$ at least even when the focal length of the taking lens is preset on a telephoto side. That is, this makes it possible to perform flash photography at a high magnification by a simple device.

Figure 15:
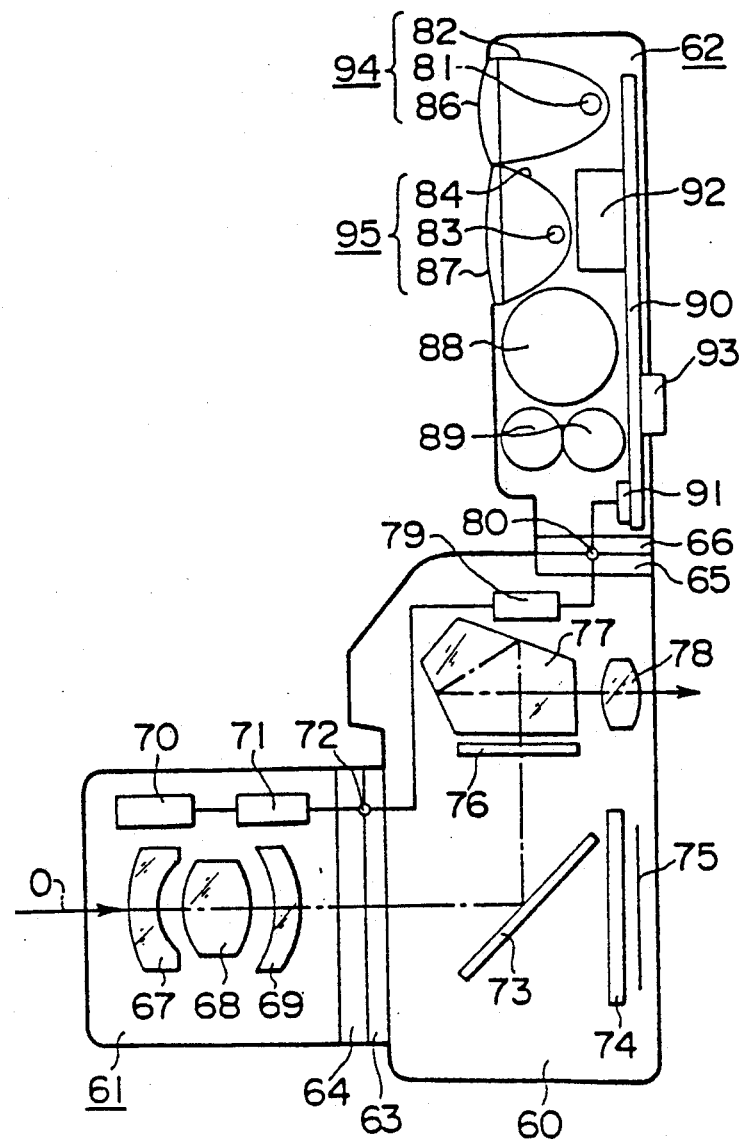
FIG. 15 is a longitudinal sectional view showing a main part of a system single-lens reflex camera on which a flash device, a third embodiment of the invention is mounted.

Referring now to FIG. 15, there is shown a longitudinal sectional view showing a main part of a third embodiment of a system single-lens reflex camera having an external flash unit in which the present invention is embodied. The third embodiment is different from the first and second embodiments in that the present invention is embodied in a camera to which a flash unit is externally mounted. An exchangeable lens barrel 61 is mounted on a camera body 60 by an engagement between a lens mount 64 and a body mount 63. The accessory flash unit 62 is mounted on the camera body by the engagement between a flash side accessory shoe 66 and a camera side accessory shoe 65. Light which has transmitted through taking lenses 67, 68 and 69 is incident upon a movable reflection mirror 73 which is obliquely provided at 45° with respect to a photographic optical axis O. The light is reflected in an upward direction and is transmitted through a focusing screen 76 by which the light is diffused. A light image on the focusing screen 76 may be viewed through a pentaprism 77 and an eyepiece lens 78. Exposure on the film 75 is conducted by moving up the movable reflection mirror 73 and actuating a focal-plane shutter 74 on photography.

In the accessory flash unit 62 there are provided a telephoto flash light emitting portion 94 comprising a flash tube 81, a reflector 82 and a condenser lens 86 which are designed to provide an exposure angle covering an angle of view of a telephoto lens having a focal length longer than a given focal length and a wide-angle flash light emitting portion 95 comprising a flash tube 83, a reflector 84 and a condenser lens 87 which are designed to provide an exposure angle covering an angle of view of a wide-angle lens having a shorter focal length. A main capacitor 88 for flash and a battery 89 are provided below both flash light emitting portions. A flash control board 90 is provided at the rear of the flash light emitting portion 95. The wide angle reflector 84 has a depth smaller than that of the telephoto reflector since the former provides a convergence lower than the latter. Accordingly, large size electric components 92 such as transformers may be disposed at the rear of the wide-angle reflector 84.

The flash light emitting portion 94 is disposed at a position farther than the flash light emitting portion 95 with respect to the taking lens when the flash unit is mounted on the camera body 60.

Switching of the flash devices will now be described. When the lens barrel 61 is of a zoom type, a CPU 71 for the zoom lens reads the output of the zoom encoder 70 as focal length information and transmits a signal to a camera control CPU 79 via a contact 72. The camera control CPU 79 transmits the signal via a contact 80 to a flash control CPU 91 which controls the switching of flashes. The flash control CPU 91 triggers the wide-angle flash light emitting portion 95 and the telephoto flash light emitting portion 94 in response to the signal when the focal length of the exchangeable lens is at the wide-angle side and the telephoto side with respect to a given focal length, respectively.

When the exchangeable lens 61 is a single-focal lens, it will suffice to replace the zoom encoder 70 with a ROM which stores the focal length of the single-focal lens. This makes it possible to generate flash at illumination angles which may cover angles of image of respective exchangeable lenses.

A manual flash changing switch 93 which is disposed at the rear of the accessory flash unit 62 is adapted to manually select one of the flash light emitting portions independently of the focal length of the taking lens. This switch 93 is used for photography giving a spotlight effect by firing the telephoto flash light emitting portion 94 when the taking lens is on the wide-angle side, or is used for photography using a bounce of light outside of the angle of image by firing the telephoto flash light emitting portion 95 when the taking lens is on the telephoto side.

Also in the third embodiment, a distance encoder at the lens or camera body side makes it possible to fire the telephoto flash light emitting portion 95 responsive to an output from the encoder independently of the focal length of the taking lens when the object is at a distance closer to a given distance.

An optimal design of the flash device makes it possible to flash at a higher guide number in the third embodiment than an accessory flash unit having an illumination angle changing capability and to realize a flat accessory flash unit which is conveniently portable.

FIGS. 16(A) and 16(B) are a front view and a sectional view taken along the line E—E of FIG. 16(A) showing a third embodiment of a lens shutter camera having a built-in zoom lens in which the present invention is embodied, respectively. The fourth embodiment is different from the first, second and third embodiments in that the former is applied to the lens shutter camera while the latter embodiments are applied to a single-lens reflex camera. Light which has transmitted through a first taking lens 101, a known lens shutter unit 103, and a second taking lens 102 is imaged upon a film 113 which is released from a film cartridge 112 and to be taken-up by a spool 114.

Two batteries 115 are disposed in a grip part (left side as viewed in the drawing) of the camera. On the side opposite to the grip there are provided a telephoto flash light emitting portion 122 comprising a flash tube 106, a reflector 107, and a condenser lens 110a which are designed to provide a flash illumination angle covering an angle of view of the built-in taking lens which is on the side of a focal length longer than a given focal length; and a wide-angle flash light emitting portion 123 comprising a flash tube 108, a reflector 109 and a condenser lens 110b which are designed to provide a flash illumination angle covering an wide angle of view of the built-in taking lens which is at the shortest focal length. The condenser lenses 110a and 110b are formed integrally with a flash window 110. The flash light emitting portion 122 is disposed at a position more remote from an optical axis O of the taking lens than the flash light emitting portion 123.

In the fourth embodiment, the wide-angle flash light-emitting portion 123 having a smaller dimension in an direction of optical axis is disposed in front of the magazine 112. A main capacitor 111 for flash having a diameter smaller than that of the magazine 112 is disposed at the rear of the telephoto flash light emitting portion 122 having a large dimension in a direction of optical axis. Accordingly, a high guide number of flash device may be incorporated into the camera without enlarging the dimension in comparison with the some type of camera having a conventional built-in flash device with a zooming or illumination angle changing mechanism.

The output from the zoom encoder 104 is inputted to a control circuit 105 which controls the entire of the camera including the flash. The housing of the camera comprises a front covering 100 and a rear lid 116 which is hinged at a hinge 117 to open or close therearound. A release button 118 is disposed on the grip 121. A view-finder 119 and a focus sensor 120 are disposed above the taking lens 101. A signal of the object distance from the focus sensor 120 is inputted into the control circuit 105.

Now, switching of the flash light emitting portions will be described. If the built-in zoom lens is at a wide-angle position or the focal length is shorter than a given focal length, the control circuit 105 fires the wide-angle flash light emitting portion 123 in response to an output from the zoom encoder 104. If the built-in zoom lens is at a telephoto position or the focal length is longer than a given value, the control circuit 105 responsive to the outputs from the zoom encoder 104 and the focus sensor 120 fires the telephoto flash light emitting portion 122 when the object distance is longer than a given distance and fires the wide-angle flash light emitting portion 123 when the object distance is shorter than a given value.

In the thus formed fourth embodiment, a lens shutter camera having a built-in zoom lens and a built-in high guide number flash may be realized. In addition, if a pop-up mechanism is incorporated in a camera for preventing red-eye phenomenon, it will suffice to move both the wide-angle and telephoto flash light emitting portion upward and downward. Such a flash may be realized more readily than a built-in flash with a zoom mechanism.

In the aforementioned embodiment of the present invention, two flashes having different illumination angles are provided. In order to cope with the lens changeable system camera on which various lenses such as high magnification zoom lenses may be mounted, flash means having more than 2 different illumination angles may be provided to realize a flash device having a large number of functions.

In brief, the concept of the flash device of a camera of the present invention may be illustrated in FIG. 17. A flash device for a camera comprises a plurality of flash light emitting portions 304, 305 having different flash illumination angles; a single common electric charge storage means 306 which supplies energy to each of a plurality of the flash light emitting portions 304, 305; a plurality of trigger means 302, 303, each corresponding to each one of the flash light emitting portions 304, 305 and; control means 301 responsive to the focal length of a taking lens disposed in the camera to determine which of a plurality of the light emitting portions 304, 305 to be fired and to trigger which of a plurality of the trigger means 302, 303 corresponding to said light emitting portion 304, 305 to be fired.

As having described the present invention, a plurality of flash light emitting portions having different illumination angles including reflection mirrors, condenser lenses, flash tubes which are optimally designed for each illumination angle are provided. Flash conditions are changed in response to the focal length of a taking lens. A common electric charge storage means for supplying electric energy to all flash light emitting portions is provided. A trigger circuit is provided for each flash light emitting portion. The flash light emitting portions are switched by selectively activating the trigger circuits. Therefore, the following distinct advantages may be obtained: Each of a plurality of flash light emitting portions having different illumination angles can accomplish a high efficient light emission. The size of the electric circuit can be made smaller. A compact, simple, highly reliable and illumination angle variable flash device may be provided.

While the invention has been particularly shown and described with reference to preferred embodiments thereof, it will be understood by those skilled in the art and the foregoing and other changes in form and details can be made therein without departing from the spirit and scope of the invention.

What is claimed is:

1. A flash device for a camera having a taking lens comprising:
   a plurality of flash light emitting portions having different flash illumination ranges; and
   control means responsive to the focal length of the taking lens of the camera for selectively firing one of a plurality of flash light emitting portions.

2. A flash device for a camera as defined in claim 1 in which said control means selects a flash light emitting portion of a plurality of said flash light emitting portions, having a wide flash illumination range for firing the same when an object distance is smaller than a given distance.

3. A flash device for a camera as defined in claim 2 in which said control means obtains object distance information from means for detecting a focussed position of a taking lens.

4. A flash device for a camera as defined in claim 1 and further including single power supply means for supplying electric power to a plurality of the flash light emitting portions;
   and a plurality of trigger means for activating each of a plurality of the flash light emitting portions to fire the same;
   said control means being adapted to select one of the trigger means to fire one of a plurality of the flash light emitting portions.

5. A flash device for a camera as defined in claim 1 in which a flash light emitting portion of a plurality of the flash light emitting portions having a narrower illumination range is disposed at a position farther from an optical axis of the taking lens than the other flash light emitting portions.

6. A flash device for a camera as defined in claim 1 in which a plurality of said flash light emitting portions are juxtaposed in a linear direction which perpendicularly intersects an optical axis of said taking lens.

7. A flash device for a camera as defined in claim 1 in which a plurality of said flash light emitting portions are juxtaposed in a height direction of a body of the camera.

8. A flash device for a camera as defined in claim 1 in which a plurality of said flash light emitting portions are enabled to emit light when they are in a position extending from the upper surface of the camera body.

9. A flash device for a camera as defined in claim 1 in which said control means obtains focal length information from a focal length detecting means disposed at the taking lens.

10. A flash device for a camera as defined in claim 1 in which a flash light emitting portion of a plurality of said flash light emitting portions, having a wider flash illumination range is disposed at a position farther from an optical axis of the taking lens other than the other flash light emitting portions.

11. A method of controlling light emission of a plurality of flash light emitting portions of a flash device having different illumination ranges for photographing purposes comprising the steps of:
   determining whether or not the flash light emitting portions are enabled to fire;
   determining whether or not the focal length of a taking lens is longer than a given focal length;

selecting a flash light emitting portion having a smaller flash illumination range for firing the same when the focal length is longer than a given focal length; and selecting a flash light emitting portion having a wider illumination range for firing the same when the focal length of the taking lens is shorter than a given focal length.

12. A method of controlling light emission as defined in claim 11 and further including the step of selecting a flash light emitting portion having a wide illumination range for firing the same when the focal length of the taking lens is longer than a given focal length and the object distance is smaller than a given distance.

13. A camera comprising:
 a taking lens;
 means for adjusting the focal length of the taking lens;
 a plurality of flashlight emitting means each having a different flash illumination range;
 control means responsive to the focal length position of the adjustable taking lens for selectively enabling one of said flashlight emitting means.

14. A camera according to claim 13 further comprising control means for operating the camera and enabled flash means in a synchronized manner.

* * * * *

UNITED STATES PATENT AND TRADEMARK OFFICE
CERTIFICATE OF CORRECTION

PATENT NO. : 5,019,845
DATED : May 28, 1991
INVENTOR(S) : Asakura et al.

It is certified that error appears in the above-identified patent and that said Letters Patent is hereby corrected as shown below:

In the Abstract: Line 9, change "trigger" to --triggers--

Column 1, line 61, change "63-20,30" to --63-2030,--

Column 5, line 60, change "contact" to --contacts--

Column 14, line 39, change "63" to --53--

Column 16, line 44, change "an" to --a--

Column 16, line 52, change "an" to --a--

Signed and Sealed this

Sixteenth Day of February, 1993

Attest:

STEPHEN G. KUNIN

*Attesting Officer*  *Acting Commissioner of Patents and Trademarks*